May 16, 1961     W. O. FAITH ET AL     2,984,435
MISSILE TERMINAL GUIDANCE SYSTEM CONTROLLER

Filed April 5, 1956                                                 3 Sheets—Sheet 1

INVENTORS
Winston O. Faith
Howard W. Prier
Albert E. Wasserman
BY W. R. Robertson
AGENT May 16, 1961   W. O. FAITH ET AL   2,984,435
MISSILE TERMINAL GUIDANCE SYSTEM CONTROLLER
Filed April 5, 1956   3 Sheets-Sheet 3

INVENTORS
Winston O. Faith
Howard W. Prier
Albert E. Wasserman

BY W. R. Robertson
AGENT 2,984,435

MISSILE TERMINAL GUIDANCE SYSTEM CONTROLLER

Winston O. Faith, Arlington, Howard W. Prier, Dallas, and Albert E. Wasserman, Arlington, Tex., assignors to Chance Vought Corporation, a corporation of Delaware Filed Apr. 5, 1956, Ser. No. 577,184

10 Claims. (Cl. 244—14)

This invention relates to a directional control device for steering a guided missile in its terminal dive maneuver, i.e., control of the missile from the release or dump point to termination or impact on the target. In its more restricted aspect, an inertial terminal controller is disclosed which utilizes both longitudinal and lateral accelerometers for sensing the distance, both longitudinally (fore and aft) and laterally (sidewise), that the missile has moved from a preset terminal dive flight path, which further provides the pitch, yaw, and roll servo control systems of the missile's guidance system or auto-pilot with the proper respective control commands, after being limited to prevent self-destruction throughout the terminal dive maneuver. These pitch, yaw, and roll servo control systems operate their respective control surfaces of the particular type of control system utilized.

A principal object of the disclosed invention is to provide a terminal guidance system that continually senses and corrects a missile's position with coordinated pitching, yawing and rolling commands during it terminal maneuver between the release point and the target.

Another object of this invention is to produce corrective command signals to provide co-ordinated flight or dive about the missile's three, pitch, yaw, and roll axes in correcting the missile's position during its terminal maneuver.

Yet another object of this invention is to utilize accelerometers on a gyro-stabilized platform in the missile so aligned as to sense the exact longitudinal and lateral acceleration of the missile throughout the terminal dive maneuver.

Another object of this invention is to provide a three dimensional terminal controller for a guided missile wherein the roll command is a function of a lateral accelerometer fixed to the missile airframe structure.

Another object of this invention is to provide a guided missile three dimensional terminal controller with a roll command proportional to rudder deflection.

Another object of this invention is to provide a terminal controller for guiding a missile about its three, pitch, yaw, and roll axes, utilizing a constant pitching rate command with the yawing rate and roll commands derived from RF signals from a remote station.

A further object of this invention is to provide command signals that are limited only to such a degree as to prevent the forces developed from exceeding the missile's structural limitations to prevent self-destruction due to overloading of the control surfaces.

Other objects and advantages will be apparent from the specification and claims, and from the accompanying drawings which illustrate the invention.

Heretobefore, the method of executing the terminal maneuver was to simply push over, at the dump point, at a constant pitch rate until the missile was headed straight down, and the missile was then controlled by rudder deflection only to give corrective yawing to compensate for sidewise wind drift.

Our disclosed system provides greatly increased accuracy because the above prior system failed to correct for a head or tail wind during the terminal maneuver, and it also caused the missile to disintegrate due to the large forces required to turn the missile toward the target during the high speed dive by means of skid turns with the result that these forces often exceeded the ultimate strength of the missile's structure.

Briefly, our missile terminal guidance system controller is an inertial terminal controller consisting of a gyrostabilized platform maintained in substantially horizontal position for carrying longitudinal and lateral accelerometers. The longitudinal control command signals to the pitch servo control system of the auto-pilot are derived from the longitudinal accelerometer while the lateral control command signals to both the yaw and roll servo control systems of the auto-pilot are derived from the lateral accelerometer. The three control signals are so generated by the controller as to provide co-ordinated flight or dive control of the missile about its pitch, yaw, and roll axes, i.e., flight or dive maneuvers wherein the aerodynamic loads are always normal to the wing plane and accordingly resulting in no skidding or slipping of the aircraft and no destructive side forces therefrom.

Figure 1:
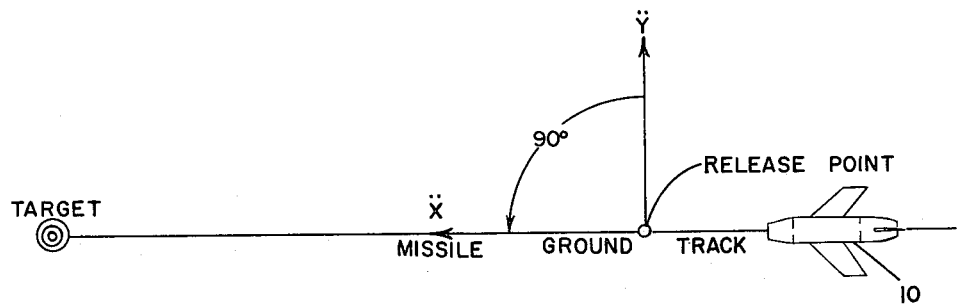
Fig. 1 is a plan view of the missile's flight path during its terminal dive maneuver.
Figure 2:
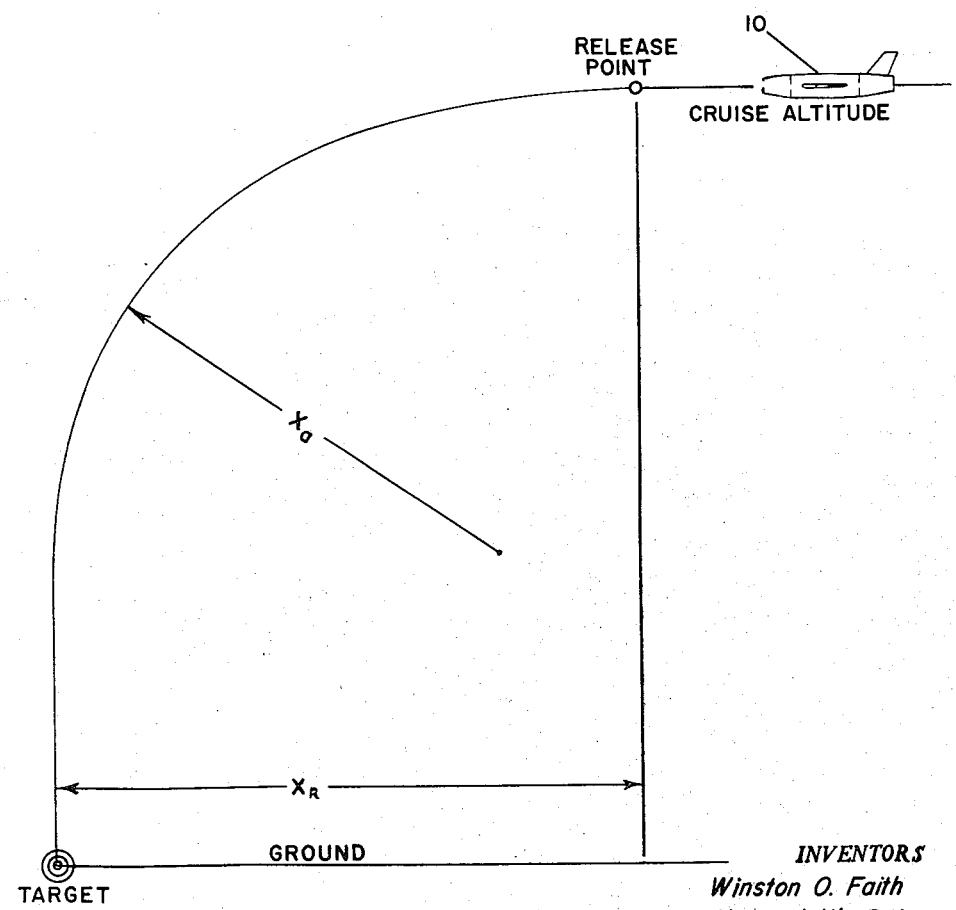
Fig. 2 is a side view of Fig. 1.

Fig. 1 discloses plan and front views of the flight path of the guided missile 10 in the last or terminal portion of its flight or dive, particularly from the release or dump point to the target.

Figure 3:
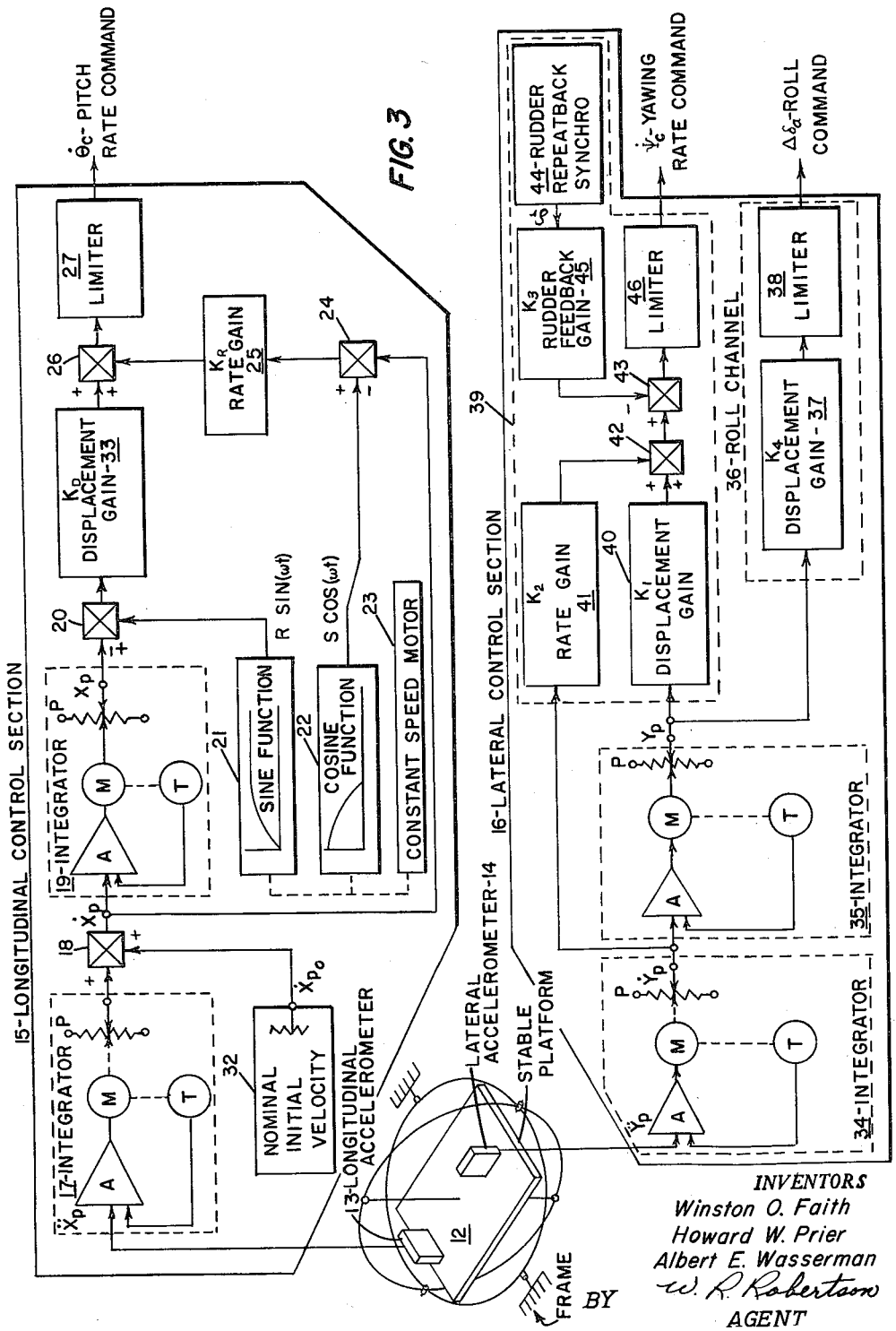
Fig. 3 is a block diagram of the inertial terminal controller having both longitudinal and lateral control sections.

In the disclosed missile terminal guidance system, an inertial terminal controller or missile control command generating system as disclosed in Fig. 3, is utilized to sense the position of the guided missile 10 and to provide control command signals $\theta_c$, $\Psi_c$, and $\Delta\delta_a$ to each of the pitch, yaw, and roll servo control systems, respectively, of the missile's auto-pilot (not shown) or pitch, yaw and roll guidance control system. Accordingly this missile may be either of the air-to-surface or surface-to-surface type.

The inertial terminal controller obtains its guidance information from the mechanization of the following equations where a dot ($\cdot$) over a quantity signifies time rate of change or the derivative with respect to time of this quantity.

*Mathematics for longitudinal control*

The formula for release point computation is:

$$X_R = X_a + (\dot{X}_{To} - \dot{X}_{Po})t_f \qquad (1)$$

where $X_R$ = horizontal distance from release point to target.

$X_a$ = radius of curvature of arcuate portion of flight path and equals approximately $$\left(\frac{U_o}{\dot{\theta}_o}\right)$$

nominal, wherein $U_o$ is the missile forward speed at the release point and $\dot{\theta}_0$ is the desired nominal pitching rate for pitchover at the release point.

$\dot{X}_{T0}$—missile's true inertial velocity (true ground speed) component parallel to the intersection of the target plane (vertical plane through the release point and the target) and the horizontal plane from the release point.

$\dot{X}_{P0}$—missile initial velocity component parallel to the intersection of the target and horizontal planes from the release point as indicated by the inertial equipment. This is preset on nominal initial velocity potentiometer.

$t_f$—time of flight for terminal maneuver from the release point to impact.

The formula for pitching rate command computation is:

$$\dot{\theta}_c = K_D X_E - K_R \dot{X}_E \tag{2}$$

where $\theta$=pitch angle measured from horizontal in accordance with NACA convention.

$$X_E = \iint \ddot{X}_P dt dt + \dot{X}_{P0} t - R \sin(\omega t) \tag{3}$$

and where $\dot{\theta}_c$=pitching rate command measured in accordance with NACA convention.
$K_D$=a constant, longitudinal displacement gain.
$K_R$=a constant, longitudinal rate gain.
$X_E$=longitudinal error signal from a preset or programmed nominal path defined by Equation 3.
$\dot{X}_E$=time rate of change of $X_E$.
$\ddot{X}_P$=missile's acceleration component parallel to intersection of target and horizontal planes as measured by the longitudinal accelerometer.
$t$=time measured from release point.
$R$=constant determined by analysis of trajectory for terminal maneuver.
$\omega$=constant substantially equal to desired nominal pitching rate.

$$\dot{X}_E = \int \ddot{X}_P dt - S \cos(\omega t) + \dot{X}_{P0} \tag{4}$$

for all values of $t$ when $\omega t < \pi/2$. When $\omega t \geq \pi/2$ then $\sin \omega t = 1$ and $\cos \omega t = 0$ where $S$=constant determined by analysis of trajectory for terminal maneuver and consistent with R.

Fig. 3 discloses the inertial terminal controller consisting of the following three portions:

(1) A gyro-stabilized platform 12 maintained in substantially horizontal position and carrying two accelerometers 13 and 14 for measuring the missile acceleration components;

(2) A longitudinal control section 15 for pitch control; and (3) A lateral control section 16 comprising roll as well as yaw control.

Gyro-stabilized platform

The stable platform 12, Fig. 1, which carries the longitudinal and lateral accelerometers, is maintained level by a servo system which keeps the platform aligned with references established by three gyros. When the terminal dive maneuver begins, the platform's levelling system is shut off so that accelerations of the missile during the maneuver will not affect the platform's alignment with the horizontal. Alignment of the platform in azimuth is maintained by a servo system (not shown) which keeps the platform aligned with a gyro azimuth reference. This azimuth reference gyro is preset so that in the region of the target the two accelerometers sense the longitudinal and lateral components of acceleration as shown in Figure 1.

Longitudinal control—Pitch command signal

Longitudinal accelerometer 13, is aligned on the gyro-stabilized platform 12 so that the sensitive axis $\ddot{X}$, Fig. 1 is parallel to the intersection of the target plane and the horizontal plane through the missile whereby the missile's longitudinal acceleration in this direction is sensed, i.e. this acceleration has no value when the missile is diving with its velocity vector pointed vertically downwardly. An electro-mechanical motor-generator type integrator 17 is provided with a voltage from the latter accelerometer proportional to the missile's longitudinal acceleration. This integrator 17 integrates the acceleration output $\ddot{X}_P$ from the longitudinal accelerometer to provide a voltage output proportional to longitudinal velocity $\dot{X}_P$. The output of this integrator 17 is added to a constant voltage source from a precision wire wound (or other suitable type) potentiometer by an electrical mixer or summing amplifier 18. This voltage, representing the nominal velocity $\dot{X}_P$ of the missile at the time of initiation of the dive, is preset prior to missile launching. This sum or resultant voltage $\dot{X}_P$ is integrated again by integrator 19 similar to integrator 17, to provide a voltage $X_P$ proportional to the horizontal distance traveled by the missile from the release point in the target plane.

The elevator signal or pitching rate command signal to the longitudinal servo control system is derived from a voltage proportional to the sum of the following two quantities:

(1) The product of the displacement gain constant $K_D$ from displacement gain potentiometer 33, Fig. 3, and the difference between the outputs of integrator 19 and the sine function potentiometer 21, and (2) the product of the constant $K_R$ of the rate gain 25 and the difference between the outputs of integrator 17 and the cosine function potentiometer 22. Both sine and cosine function potentiometers are precision resistors that are wound to produce the respective functions $R \sin(\omega t)$ and $S \cos(\omega t)$. Both potentiometers are driven by a constant speed motor 23 which starts at the instant the missile reaches the release point, time $t$ likewise beginning at time of release.

Summing amplifiers 20, 24, and 26 perform the above additions.

The resultant sum of the above voltages is limited by a limiter 27 comprising a diode or the like which is set to prevent actuation of the control surfaces to such an extent as to exceed the structural limitations of the missile. The resulting limiter output is then the final pitching rate command $\dot{\theta}_c$ to the longitudinal servo control system or circuitry of the missile auto-pilot (not shown). Accordingly, the velocity of translation and acceleration of translation of said missile are maintained within its structural limits. The pitch servo, in response to the pitching rate command $\dot{\theta}_c$, actuates the control surface utilized to cause pitch of the aircraft or missile. While the missile 10 as illustrated may utilize ailavators for the pitch control surfaces, obviously other pitch control surfaces may be incorporated as elevators or the like.

It may be noted further that the shape of the terminal maneuver may be varied to satisfy the requirements of approach to the target at various speeds and altitudes by adjustment of the constants R, S, $\omega$, and $\dot{X}_{P0}$.

Summarizing, the longitudinal control system is essentially a feedback control system which regulates the missile's pitch attitude so that the forward acceleration agrees with a preset schedule of forward acceleration versus time. The electrical signal which represents the longitudinal acceleration is integrated with respect to time by the integrator 17. An initial condition represented by the nominal initial velocity component $\dot{X}_{P0}$ of the missile parallel to the intersection of the target and horizontal planes from the release point must be transmitted to summing amplifier 18 so that the electrical output of the amplifier represents the horizontal component $\dot{X}_P$ of the longitudinal velocity at any time during the dive. When the release or dump point is approached with a velocity which is other than the nominal initial condition velocity the release or dump point is shifted by a longitudinal distance equal to the product of the initial condition velocity error and the time of flight from release to impact.

The longitudinal velocity signal is integrated by the second motor-generator 19 yielding an elctrical output proportional to the horizontal component of longitudinal distance traveled from the release point at any time after release. As the missile approaches the target under control of some mid-course guidance system, the command to release or push over into the dive maneuver occurs at a predetermined horizontal distance from the target in accordance with the Equation 1. At the instant of the push over command, the constant speed motor 23 begins turning special sine and cosine function potentiometers 21 and 22. The special sine function potentiometer 21 is driven at constant speed from zero to a ninety degree stop and is used as a programmed longitudinal distance command. The output voltage of this potentiometer at the ninety degree position corresponds to the desired horizontal component of longitudinal distance from the release point to the target, and its output at any position from zero to ninety degrees corresponds to the desired longitudinal distance from the release point at that instant of time.

The output of the distance command potentiometer 21 is continuously compared to the output of the second integrator 19 by an electrical mixer or summing amplifier 20. The output of this summing amplifier represents the horizontal component of longitudinal distance error, $X_E$. The effect of this voltage is to produce pitching rate commands to the missile stabilization system or auto-pilot so that the missile pitches up or down until the output of the second integrator 19 is equal and opposite to the output of the distance command potentiometer 21 thereby reducing the longitudinal distance error to zero.

In order to have adequate system damping, a signal $\dot{X}_E$ proportional to the rate of change of the distance error is added to the distance error signal $X_E$ before it is fed into the control circuitry. This distance rate error is derived by comparing the measured horizontal component of longitudinal velocity $\dot{X}_P$ with the output of the programmed velocity command potentiometer 22. This potentiometer is the special cosine potentiometer which is turned by the same shaft as the distance command potentiometer 21 from zero to a ninety degree stop. The output of this potentiometer 22 corresponds to the desired instantaneous horizontal velocity component at any time from release point of push over to impact. In a nominal flight when the missile gets directly over the target and headed straight down the longitudinal velocity command is zero.

It is then a linear combination of the distance error $X_E$ and the distance rate error signal $\dot{X}_E$ that go into the longitudinal or pitch control circuitry of the missile auto-pilot. In other words, mathematically, the cosine function potentiometer output is a voltage proportional to the single time integration of the desired schedule of forward acceleration. The sine function potentiometer output is proportional to the double time integration of scheduled forward acceleration. Outputs of the cosine and sine function potentiometers are continuously compared with the integral and the double integrals, $\dot{X}_P$ and $X_P$, respectively of forward acceleration as sensed by the longitudinal accelerometer. A linear combination of the results of the two comparisons is then used as a pitching rate command $\theta_c$ to the auto-pilot with appropriate limiting to ensure against exceeding aerodynamic limitations of the control surfaces. The auto-pilot responds to this command by causing elevator surface deflection of the sense and magnitude required to cause $X_E$ and $\dot{X}_E$ to assume zero values.

*Lateral control*

The lateral control section 16 is similar in operation and details of construction to the longitudinal control section 15 with some exceptions. In this instance the control schedule of acceleration (which in the longitudinal section is produced by the sine and cosine potentiometer) is simply constant zero sidewise acceleration, i.e., the terminal maneuver flight path is held to zero transverse or sidewise acceleration. Another point of difference between the longitudinal and the lateral systems is that in order to control sidewise acceleration to the desired schedule, two auto-pilot commands are generated, whereas only one auto-pilot command is sufficient for longitudinal control.

Further features of the invention are that from the lateral accelerometer is derived both a roll command $\Delta\delta_a$ for causing aileron surface deflection and a yawing rate command $\dot{\psi}_c$ for causing rudder surface deflection in the lateral servo control system or circuitry of the missile auto-pilot (not shown). Both the yaw and roll servos, in response to the yawing rate command $\dot{\psi}_c$ and the roll command $\Delta\delta_a$, respectively, actuate their respective control surfaces utilized to cause yaw and roll, respectively, of the aircraft or missile. In the missile illustrated, the yaw servo may actuate the rudder. While the roll servo may actuate elevators, obviously other roll control surfaces may be incorporated as ailerons or the like. The roll command is one of the distinctive features of this controller not believed to be found in any previous missile terminal guidance system. Using the roll command in addition to a yawing command to correct lateral error gives a much more efficient controller because turns are thereby coordinated and the aerodynamic loads normal to the wing plane are used in correcting sidewise error.

A few entirely different methods for obtaining the roll command from the sidewise acceleration have been tested and found to be feasible and effective to varying degrees.

Figure 4:
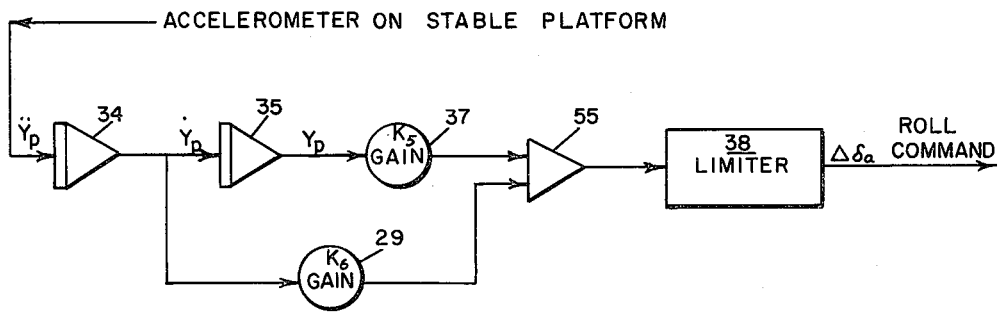
Fig. 4 is a modified roll channel of the lateral control section of the inertial terminal controller of Fig. 3.

(A) The roll command $\Delta\delta_a$ is a linear combination of the integral and the double integral of sidewise acceleration as illustrated in Fig. 4. The displacement gain in Fig. 4 which receives the outputs of the two integrators 34 and 35, includes the two gains $K_5$ and $K_6$ with a summing amplifier 55. The roll channel portion of the lateral control section 28 of the inertial terminal controller of Fig. 4 is the same as that (16) of Fig. 3 described in detail heretofore except the gain $K_6$ 29 shown in Fig. 4 is zero in Fig. 3 and accordingly not shown. A stable platform is required for each of the lateral control sections shown in Figs. 3 and 4. The roll command portion of Fig. 3 may be regarded as a special case of Fig. 4 where the gain K6 is zero instead.

Figure 5:
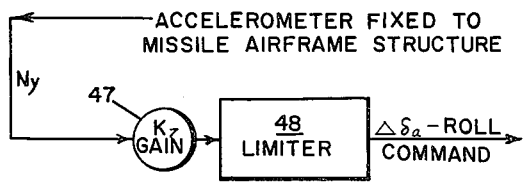
Fig. 5 is another modified roll channel of the controller of Fig. 3.

(B) The roll command $\Delta\delta_a$ may be a function of a lateral accelerometer fixed to the missile airframe structure multiplied by the constant gain $K_8$ from gain 47, illustrated by Fig. 5, and limited by limiter 48.

Figure 6:
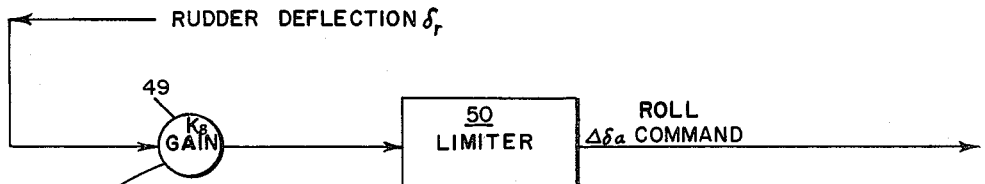
Fig. 6 is another modified roll channel of the controller of Fig. 3.

(C) The roll command $\Delta\delta_a$ may be proportional to rudder deflection $\delta_r$ multiplied by a gain constant or proportionality factor $K_6$ of gain 49 similar to $K_6$ of gain 37 utilized in Fig. 3, as illustrated in the roll channel portion of the lateral control section 31, Fig. 6, and limited by limiter 50.

Figure 7:
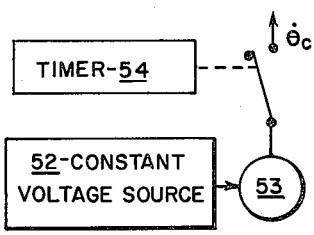
Fig. 7 is a modified longitudinal control section of Fig. 3.

(D) The roll command $\Delta\delta_a$ may be obtained from a terminal guidance controller in which the stable platform and the accelerometer utilized in Fig. 3, are not required. Instead, in deriving the roll command $\Delta\delta_a$ and the yawing rate command $\dot{\psi}_c$ in this modification, the values $\dot{Y}_P$ and $Y_P$ are provided by RF signals from a remote station which measures the missile velocity and distance components orthogonal to the target plane with conventional radio or radar methods in the absence of accelerometer outputs. The yawing rate command $\dot{\Psi}_c$ and the roll command $\Delta\delta_a$ are derived from $\dot{Y}_P$ and $Y_P$ in the yaw and roll channels, respectively, in exactly the same manner as indicated in Fig. 3. The pitching rate command $\dot{\theta}_c$, as illustrated in the longitudinal control section 51 Fig. 7, is a constant rate represented by a constant voltage output from constant voltage source 52 to the auto-pilot via a proportionality constant or gain 53 and a timer 54 connected in the circuitry to cut out the command at the appropriate time.

In each of the embodiments above, the resulting command signals are fed through a limiter to prevent control surface movements so great as to produce self-destructive forces.

In the embodiments A, B, and C above, the pitch and yawing rate commands are derived from longitudinal and lateral accelerometers, respectively, as set forth in the embodiment of Fig. 3.

Further, in the above embodiments B and C, the pitch and yawing rate commands may utilize, instead, RF signals from a remote station as set forth in the above embodiment D in providing co-ordinated flight control of the missile about all three axes, pitch, yaw, and roll.

The choice as to which of these roll command derivations is preferable depends upon the type of equipment used in supplying the error information, whether radio or inertial, and upon the flight characteristics of the missile being used.

The yawing rate command $\dot{\Psi}_c$ is the sum of a signal proportional to rudder deflection and a linear combination of the integral and the double integral of sidewise acceleration as sensed by the lateral accelerometer 14. However, before going to the auto-pilot, this command is limited as required to ensure safe operation. The negative feedback loop formed by using rudder deflection in making up the yawing rate command also acts as a safety feature since it will decrease the amount of rudder deflection corresponding to a given sidewise acceleration as rudder deflection increases.

*Mathematics for lateral control*

The following formula and mechanization thereof applies particularly to the lateral control section 16 of Fig. 3 and section 28 of Fig. 4 when gain 29 is zero.

$$\dot{\Psi}_c = (K_1 Y_P + K_2 \dot{Y}_P - K_6 \delta_r) \quad (5)$$

where $\dot{\Psi}_c$ = yawing rate command input to rudder servo control system of the auto-pilot.

$K_1$, $K_2$, $K_3$, $K_4$, $K_5$, $K_6$, $K_7$, and $K_8$—constant values determined by analysis or analog computer simulation to give desired performance characteristics.

$\ddot{Y}_P$ = missile acceleration component perpendicular to target plane as measured by accelerometer system.

$\dot{Y}_P$ = missile velocity component perpendicular to target plane as measured by accelerometer system.

$Y_P$ = integral of $\dot{Y}_P$ or missile distance component.

$\delta_r$—rudder deflection.

$$\Delta\delta_a = K_4 Y_P - K_5 \dot{Y}_P \quad (6)$$

$\Delta\delta_a$—roll command or aileron surface deflection command which is added to any aileron deflection required for normal stabilization.

$$\Delta\delta_a = K_7(N_Y)$$

$N_Y$—side load factor on the missile sensed by an accelerometer.

$$\Delta\delta_a = -K_8\delta_r$$

*Lateral control*

The sensitive axis of the lateral accelerometer 14 on the gyro-stabilized platform 12, Fig. 3, is aligned perpendicular to the target plane whereby the missile's lateral acceleration to either side of the target plane is sensed. A voltage proportional to lateral acceleration $\ddot{Y}_P$ is transmitted to integrator 34, similar to above described integrator 17 where it is integrated with respect to time to provide a voltage proportional to transverse velocity $\dot{Y}_P$ of the missile from the target plane. This transverse velocity voltage signal output is integrated a second time by integrator 35, similar in construction to the other integrators, to provide a voltage proportional to transverse distance moved by the missile from the target plane.

*Lateral control—Roll command signal*

The output of integrator 35 is fed to the roll channel 36 where it is multiplied by a constant $K_4$ supplied by a combined potentiometer and amplifier or displacement gain 37. After this product is limited by limiter 38, similar to limiter 27, it becomes the roll command signal $\Delta\delta_a$ to the roll servo system of the missile auto-pilot (not shown).

*Lateral control—Rudder command signal*

The output of the yaw channel 39 is proportional to the sum of the following three values as added by summing amplifier 42 and 43.

(1) The product of integrator 35 output and the constant $K_1$ provided by displacement gain 40, similar in construction to the displacement gain 37;

(2) The product of integrator 34 output and the constant $K_2$ provided by the rate gain 41, comprising a potentiometer and an amplifier similar to rate gain 37, both in Fig. 3;

(3) The rudder feedback 45 or repeatback voltage proportional to rudder deflection that is obtained by a rudder position sensing synchro designated as rudder repeatback synchro 44.

The resultant sum of the above three voltages is passed through limiter 46, similar in construction to limiter 27, for preventing actuation of the control surfaces to such an extent as to cause forces which exceed the structural limitations of the missile. The resultant limiter output is the yaw rate command $\dot{\Psi}_c$ or input to the yaw slaving amplifier in the missile's rudder servo control system (not shown).

In summary, an inertial terminal controller utilizing both longitudinal and lateral accelerometers is disclosed for a guided missile and which is responsive to the location of the missile, both longitudinally and laterally, with respect to a predetermined flight path from the release point to the target for providing co-ordinated flight or dive so that aerodynamic loads are always normal to the wing plane throughout the terminal dive maneuver by generating and transmitting corrective command signals to the pitch, roll, and yaw auto-pilot servo control systems. In addition, this controller has limiting means for preventing the exceeding of the missile's structural limitations.

It will be obvious to those skilled in the art that various changes may be made in the disclosed inertial terminal controller without departing from the spirit and scope thereof and therefore the invention is not limited by that which is shown in the drawing and described in the specification, but only as indicated in the appended claims.

We claim:

1. An inertial terminal controller for a guided missile having a pitch yaw and roll guidance control system comprising, a stabilized platform mounted on the missile, a longitudinal control section having inertial sensing means on said platform for sensing the longitudinal acceleration of the missile, a lateral control section having inertial sensing means on said platform for sensing the lateral acceleration of the missile, said longitudinal section having means responsive to said longitudinal acceleration sensing means for generating a guidance pitch rate command to the missile control system for controlling longitudinal movement of the missile, said lateral section having means responsive to said lateral acceleration sensing means for generating a guidance yawing rate command to the missile control system, and said lateral section having further means for generating a guidance roll command to the missile control system, both of said lateral section means providing co-ordinated missile dive control about the missile's yaw and roll axes for controlling lateral movement of the missile.

2. A three-axis terminal controller as recited in claim 1 comprising limiting switch means for further control of at least one of said missile guidance commands.

3. A three-axis inertial terminal controller for a guided missile having a pitch yaw and roll guidance control system comprising, a stabilized platform mounted on the missile, a longitudinal control section having inertial sensing means on said platform for sensing the longitudinal acceleration of the missile, a lateral control section having inertial sensing means on said platform for sensing the lateral acceleration of the missile, said longitudinal section having means responsive to said longitudinal acceleration sensing means for generating a guidance pitch rate command to the missile control system for controlling longitudinal movement of the missile, and said lateral section having means responsive to said lateral acceleration sensing means for generating both a guidance yawing rate command and a guidance roll command to the missile control system for providing co-ordinated dive control about the missile's yaw and roll axes for controlling lateral movement of the missile.

4. A three-axis inertial terminal controller for a guided missile having a pitch yaw and roll guidance control system comprising, a stabilized platform mounted on the missile, a longitudinal control section having an accelerometer on said platform for sensing the longitudinal acceleration of the missile, a lateral control section having another accelerometer on said platform for sensing the lateral acceleration of the missile, said longitudinal section having means responsive to said longitudinal accelerometer for generating a pitch rate command to the missile control system for controlling longitudinal movement of the missile, and said lateral section having means responsive to said lateral accelerometer for generating both a yaw rate command and a roll command to the missile control system, said longitudinal section means and said lateral section means providing co-ordinated dive control of the missile about its pitch, yaw, and roll axes.

5. A three-axis inertial terminal controller for a guided missile having a pitch yaw and roll guidance control system comprising, a stabilized platform mounted on the missile, a longitudinal control section having an accelerometer on said platform for sensing the longitudinal acceleration of the missile, a lateral control section having a first accelerometer on said platform and a second accelerometer adapted to be fixed to the missile airframe, said longitudinal section having means responsive to said longitudinal accelerometer for generating pitch rate commands to the missile control system for controlling longitudinal movement of the missile, said lateral section having means responsive to said first lateral accelerometer for generating a yawing rate command to the missile control system, and said lateral section having additional means responsive to said second lateral accelerometer for generating a roll command to the missile control system, said longitudinal section means and said lateral section means providing co-ordinated dive control of the missile about its pitch, yaw, and roll axes.

6. A three-axis inertial terminal controller for a guided missile having a pitch yaw and roll guidance control system including a rudder comprising, a stabilized platform mounted on the missile, a longitudinal control section having an accelerometer on said platform for sensing the longitudinal acceleration of the missile, a lateral control section having an accelerometer on said platform for sensing the lateral acceleration of the missile, said longitudinal section having means responsive to said longitudinal accelerometer for generating pitch rate commands to the missile control system for controlling longitudinal movement of the missile, said lateral section having means responsive to said lateral accelerometer for generating yawing rate commands to the missile control system, and said lateral section having means responsive to rudder deflection for generating roll commands to the missile control system, said longitudinal section means and said lateral section means providing co-ordinated dive control of the missile about its pitch, yaw, and roll axes.

7. A three-axis terminal controller for a guided missile having a pitch yaw and roll guidance control system comprising, a longitudinal control section having a constant rate signal voltage generating means for generating a constant pitch rate command, a lateral control section comprising yaw and roll channel means for receiving RF signals from a missile lateral velocity and distance measuring remote station, said yaw channel means being responsive to said RF signals for generating a yawing rate command to the missile control system, and said roll channel means being responsive to said RF signals for generating a roll command to the missile control system, said longitudinal control section means and said lateral control section means providing co-ordinated dive control of the missile about its pitch, yaw, and roll axes.

8. A three-axis inertial terminal controller for providing a guided missile having a pitch yaw and roll guidance control system with command signals comprising, a gyro-stabilized platform mounted on the missile, a longitudinal control section having an accelerometer on said platform for sensing the longitudinal acceleration of the missile, a lateral control section having an accelerometer on said platform for sensing the lateral acceleration of the missile, said longitudinal section having means responsive to said longitudinal accelerometer for generating a pitch rate command signal to the missile control system for controlling longitudinal movement of the missile during the terminal maneuver, and said lateral section having means responsive to said lateral accelerometer for generating co-ordinated yaw rate command signals and roll command signals to the missile control system for providing co-ordinated missile dive control about the missile's yaw and roll axes during the terminal maneuver.

9. A three-axis inertial terminal controller as recited in claim 8 comprising limiting switch means responsive to velocity of translation and acceleration of translation of said missile for further control of at least one of the missile guidance command signals.

10. For use in a missile having a pitch yaw and roll guidance control system, a three axis missile terminal maneuver guidance system for guiding a missile from a release point to a target through a vertical plane including the release point and the target comprising, a missile control command generating means, said means comprising a longitudinal control section having means for sensing longitudinal movement of the missile in the target plane from the release point, a lateral control section having means for sensing lateral movement of the missile orthogonal to the target plane, said longitudinal control section having means responsive to said longitudinal movement sensing means for generating pitch rate commands to the missile control system for controlling longitudinal movement of the missile in its terminal maneuver, said lateral control section having means responsive to said lateral movement sensing means for generating a yawing rate command to the missile control system, and said lateral control section having means responsive to said lateral movement sensing means for generating a rolling command to the missile control system, said longitudinal control section means and said lateral control section means providing co-ordinated flight control of the missile about its pitch yaw and roll axes.

References Cited in the file of this patent

UNITED STATES PATENTS

| | | |
|---|---|---|
| 2,591,697 | Hayes | Apr. 8, 1952 |
| 2,762,123 | Schultz | Sept. 11, 1956 |

OTHER REFERENCES

Aviation Week, Jan. 9, 1956, pp. 42, 43 and 45–47.